Patented May 22, 1945

2,376,501

UNITED STATES PATENT OFFICE 2,376,501

SOLVENT NAPHTHA PREPARATION

Theodore W. Nelson, Woodbury, Henry D. Noll, Wenonah, and Thomas P. Simpson, Woodbury, N. J., assignors to Socony-Vacuum Oil Company, Incorporated, a corporation of New York No Drawing. Application June 3, 1942,
Serial No. 445,660

5 Claims. (Cl. 196—49)

This invention is concerned with a process for converting gas oil charging stocks by catalysis to high solvent power naphtha and subsequent catalytic processing of the naphtha so produced in order to prepare higher solvent power naphtha.

Production of high solvent power naphthas, having mixed aniline numbers as low as 65° F. and below are presently produced by extraction of carefully selected crude stocks with solvents having a selective action. Such processes are invariably expensive, as a result of low yields.

We have now found that high solvent power naphthas, having mixed aniline numbers in the neighborhood of 60° F., are obtained by contacting petroleum distillates of specified nature over at least two successive cracking catalysts of the adsorptive type under certain rather definite conditions. The critical conditions of treatment are dictated by two considerations. First, the treatment must be such that a naptha of desired high solvency is produced. Second, the process is preferably so conducted as to provide maximum utility of the catalyst. This second point is important from commercial aspects as will be clearly apparent to those skilled in the art of catalytic conversion of petroleum distillates. The commercial use of cracking catalysts involves a cyclic operation comprising alternate on-stream phases during which the oil is converted and a contaminating carbonaceous deposit (known as coke) is laid down on the catalyst; and a regeneration phase in which the catalyst is substtantially restored by burning off the said deposit. In order that commercially economical operation may be practiced, it is necessary that a practical relationship be established between on-stream and regeneration phases of the cycle. Thus conversions involving excessively rapid coke deposition must be avoided in order to prevent typing up the catalytic equipment in the economically unproductive regeneration step for an excessive time. Economical use of the present invention, therefore, involves operation to satisfy two conditions. First, a high solvent power naphtha must be produced. Second, the operation is preferably so conducted as to be economically sound plant practice, using presently known equipment and catalysts.

It will be recognized that, in its broader aspects, the invention includes operations not satisfying the second condition; since it is herein disclosed how desirable solvents may be prepared using known facilities, even though such use may not be good plant economics. Further, the development of catalysts is still in progress, with constant improvement being made. It is quite probable that future catalysts, or modification in the method of using present catalysts may justify operations within the broader scope of the invention which operations would now involve regeneration times of too great extent for commercial success. The present developments in continuous catalytic conversion are exemplary of advances now being made.

In order to prepare first pass solvents of the highest quality from a given crude, it is essential that the charge stock be a gas oil, having an initial boiling point of at least about 400° F., preferably about 430° F. Charge stocks of lower initial boiling point apparently result in dilution of the product with low solvency fractions, since the mixed aniline number is substantially increased as the initial boiling point of the charge stock is reduced. As will be more fully discussed hereinafter, any petroleum crude is suitable for the source of the charge stock but we prefer to employ a distillate from naphthenic crude. As a general rule, the charge stock should possess an aniline number not substantially greater than 185° F., in order to obtain the full advantages of the invention.

From the standpoint of economical operation, it is advisable that the end point of the charge stock shall not be substantially above 600° F. since stocks containing higher boiling material give excessive coke deposition.

In discussing the catalysts used, reference will be made to the "activity" index as definitive of their nature. In determining activity index, we have employed a test which has been used with considerable success in operations in general wherein such catalysts are used. The catalyst is contacted with a standard gas oil constituting a 400° to 725° F. cut from Oklahoma City crude by passing the oil over the catalyst at 800° F. and atmospheric pressure in the absence of steam for a period of ten minutes and at a space velocity of 1½ volumes of oil (liquid basis) per volume of catalyst per hour. The percentage yield of 400° F. end point gasoline (Bruun distillation) is taken as the activity index. Two general types of catalysts are now in use, namely, clays and synthetic compositions of silica and alumina; both types being discussed in detail in various patents to Eugene J. Houdry and associates. In general, the clays show an activity index of about 35% or thereabout. The synthetic catalysts may be much more efficient, showing activity indices as high as 45%.

The charge stock described above is passed in contact with a cracking catalyst, preferably one having an activity index not less than about 38–39%, which is suitably of the synthetic type at a temperature of at least 750° F., preferably at least 860° F. The synthetic catalysts having higher activity indices and even the better clay catalysts show substantially more coke deposition than do the lower activity synthetic catalysts at the drastic temperatures employed. This first treatment with a catalyst is preferably conducted at a pressure of about 20 pounds per square inch and a space velocity of 0.5 to 2 liters of charge (liquid basis) per liter of catalyst per hour.

The products of the first treatment are fractionated to obtain a cut having a boiling range of about 200° to 400° F. which is preferably stabilized and provides the charge for the next operation. The cut so obtained is passed in the vapor state at a temperature of at least 600° F., preferably at least 800° F. over a catalyst of the same general nature of that first used. The temperature employed is as high as can be economically justified, usually not above about 875° F. Space velocities between 0.5 and 2 liters of oil (liquid basis) per liter of catalyst per hour are preferred. From the product of this second catalytic treatment, naphthas having the desired solvent power and with boiling ranges between about 200° F. and 400° F. are separated.

In the event conditions of treatment or nature of charge stock are unfavorable, as using a charge stock from paraffinic crude, it may be found desirable to again pass the 200° to 400° F. cut at least once again over a catalyst under conditions similar to those set out for the second treatment. Similarly, good naphthas produced in accordance with the invention may be further improved by one or more additional treatments. By means of the process here described, solvent naphthas having mixed aniline numbers as low as 55° F. have been produced.

The cut preferably taken as product after the second catalytic treatment is that boiling between 195° and 395° F., referred to as the basic solvent fraction. This cut may be separated as such and subsequently refractionated to produce solvents of narrower range or it may be taken out as a plurality of cuts, each adapted to special uses.

Exemplary of the benefits of the invention are the specific solvents listed in the table below. The charge stock for the second catalytic treatment is identified and the conditions of the said second treatment are specified together with mixed aniline number of the solvent in order to show trends with variations in the process. The "mixed aniline number" referred to herein is the aniline point of a mixture of equal volumes of the solvent fraction and a standard naphtha distilling between 330° and 445° F. and having an aniline point of 140° F.±0.4° F.

We claim:

1. The process of preparing petroleum solvent naphtha which comprises passing a charge stock constituting the 430° to 600° F. cut of mineral oil crude having an aniline number not substantially greater than 185° F. in contact with a synthetic cracking catalyst having an activity index of at least 38% under a pressure of about 20 pounds per square inch at a space velocity of 0.5 to 2 volumes of said stock per volume of catalyst per hour and a temperature not substantially below 860° F., separating from the treated vapors a cut of 200° to 400° F. boiling range, passing said cut in contact with a synthetic cracking catalyst having an activity index of at least 38% at a space velocity of 0.5 to 2 volumes of said cut per volume of catalyst per hour and a temperature of at least 800° F. and separating from the so treated vapors a solvent cut boiling between about 195° and 395° F.

2. The process of preparing petroleum solvent naphtha which comprises passing a charge stock constituting the 430° to 600° F. cut of mineral oil crude having an aniline number not substantially greater than 185° F. in contact with a synthetic cracking catalyst having an activity index of at least 38% at a space velocity of 0.5 to 2 volumes of said stock per volume of catalyst per hour and a temperature not substantially below 860° F., separating from the treated vapors a cut of about 200° to 400° F. boiling range, stabilizing said cut, passing said cut in contact with a synthetic cracking catalyst having an activity index of at least 38% at a space velocity of 0.5 to 2 volumes of said cut per volume of catalyst per hour and a temperature of at least 800° F. and separating from the so treated vapors a solvent cut boiling between about 195° and 395° F.

3. The process of preparing petroleum solvent naphtha which comprises passing a charge stock constituting the 430° to 600° F. cut of naphthenic crude oil having an aniline number not substantially greater than 185° F. in contact with a silica-alumina catalyst having an activity index of at least 38% at a temperature of at least 750° F., separating from the treated vapors a cut of 200° to 400° F. boiling range, passing said cut in contact with a synthetic cracking catalyst having an activity index of at least 38% at a space velocity of 0.5 to 2 volumes of said cut per volume of catalyst per hour and a temperature of at least 800° F. and separating from the so treated vapors a solvent cut boiling between about 195° and 395° F.

4. The process of preparing petroleum solvent naphtha which comprises passing a charge stock constituting the 430° to 600° F. cut of mineral oil crude having an aniline number not substantially greater than 185° F. in contact with a synthetic cracking catalyst having an activity index of at least 38% under a pressure of about 20

| Charge stock | 400° F. EP motor gasoline. | 300°–400° F. naphtha | 320°–420° F. naphtha | 254°–417° F. naphtha. |
|---|---|---|---|---|
| Produced by | Cracking Mirando stock on synthetic catalyst. | Cracking coastal stock on synthetic catalyst. | Cracking Mirando stock on clay catalyst. | Cracking Mirando stock on synthetic catalyst. |
| Reprocessed on | 45% act. synthetic catalyst. | 41% act. synthetic catalyst. | 41% act. synthetic catalyst. | 41% act. synthetic catalyst. |
| Reprocessing conditions: | | | | |
| Temperature, °F | 810 | 875 | 875 | 875. |
| Pressure, lbs./sq. inch (gauge) | 50 | 30 | 30 | 30. |
| Space velocity, vols. chg./vol. cat./hr. | 1.0 | 1.50 | 1.0 | 1.50. |
| Time on stream, mins | 20 | 6 | 10 | 6. |
| Steam, per cent wt. chg | 0 | 0 | 0 | 0. |
| Mixed aniline No. (°F.) of 285°–395° F., solvent fraction: | | | | |
| Before reprocessing | 72 | 100 | 105 | 72. |
| After reprocessing | 62 | 82 | 81 | 66. | pounds per square inch at a space velocity of 0.5 to 2 volumes of said stock per volume of catalyst per hour and a temperature not substantially below 860° F., separating from the treated vapors a cut of 200° to 400° F. boiling range, stabilizing said cut, passing said cut in contact with a synthetic cracking catalyst having an activity index of at least 38% at a space velocity of 0.5 to 2 volumes of said cut per volume of catalyst per hour and a temperature of at least 800° F. and separating from the so treated vapors a solvent cut boiling between about 200° and 400° F.

5. A petroleum solvent naphtha prepared by the process which comprises passing a charge stock constituting the 430° to 600° F. cut of mineral oil crude having an aniline number not substantially greater than 185° F. in contact with a synthetic cracking catalyst having an activity index of at least 38% under a pressure of about 20 pounds per square inch at a space velocity of 0.5 to 2 volumes of said stock per volume of catalyst per hour and a temperature not substantially below 860° F., separating from the treated vapors a cut of 200° to 400° F. boiling range, stabilizing said cut, passing said cut in contact with a synthetic cracking catalyst having an activity index of at least 38% at a space velocity of 0.5 to 2 volumes of said cut per volume of catalyst per hour and a temperature of at least 800° F. and separating from the so treated vapors a solvent cut boiling between about 195° and 395° F.

THEODORE W. NELSON.
HENRY D. NOLL.
THOMAS P. SIMPSON.